W. R. GREENLEE
WELL EQUIPMENT.
APPLICATION FILED JAN. 29, 1916.
1,312,442.
Patented Aug. 5, 1919.
6 SHEETS—SHEET 5.
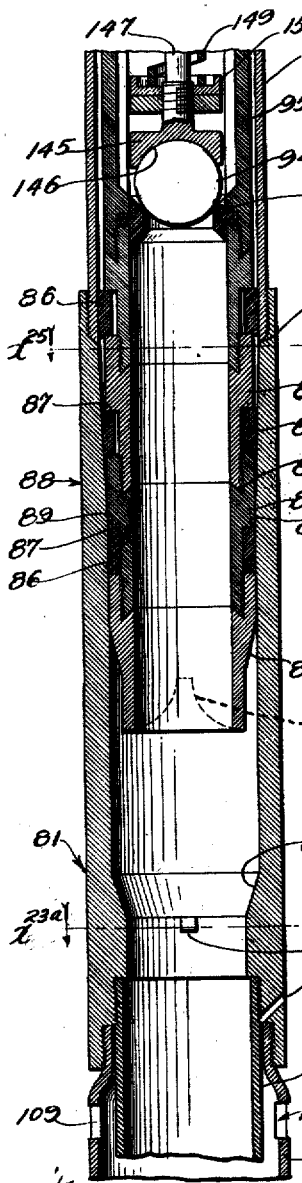
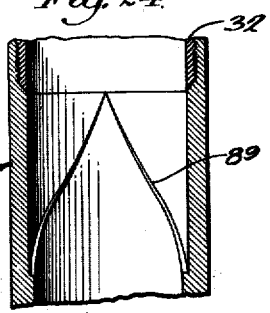
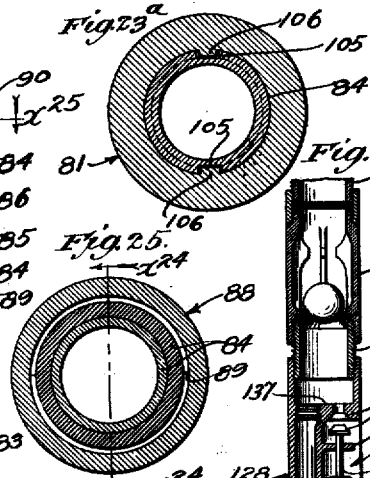
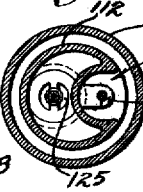
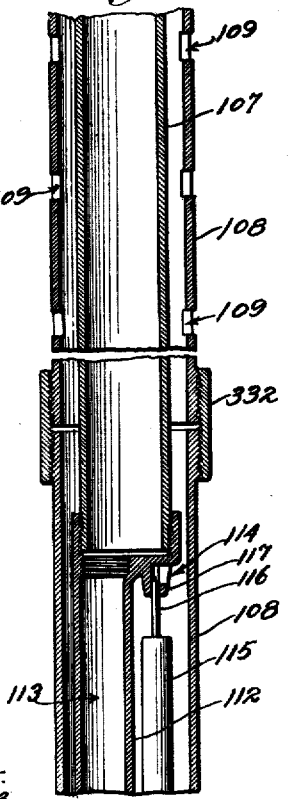

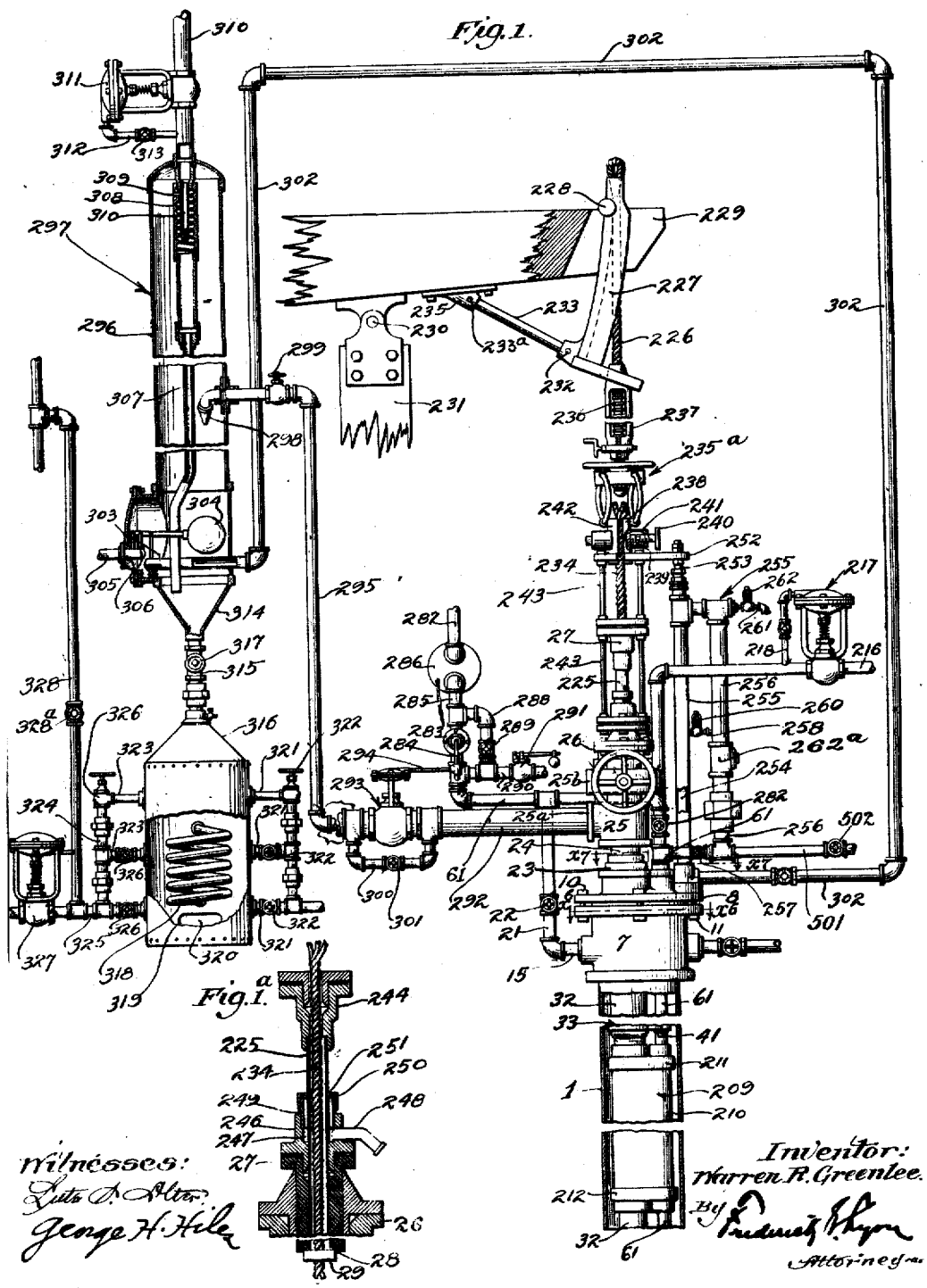

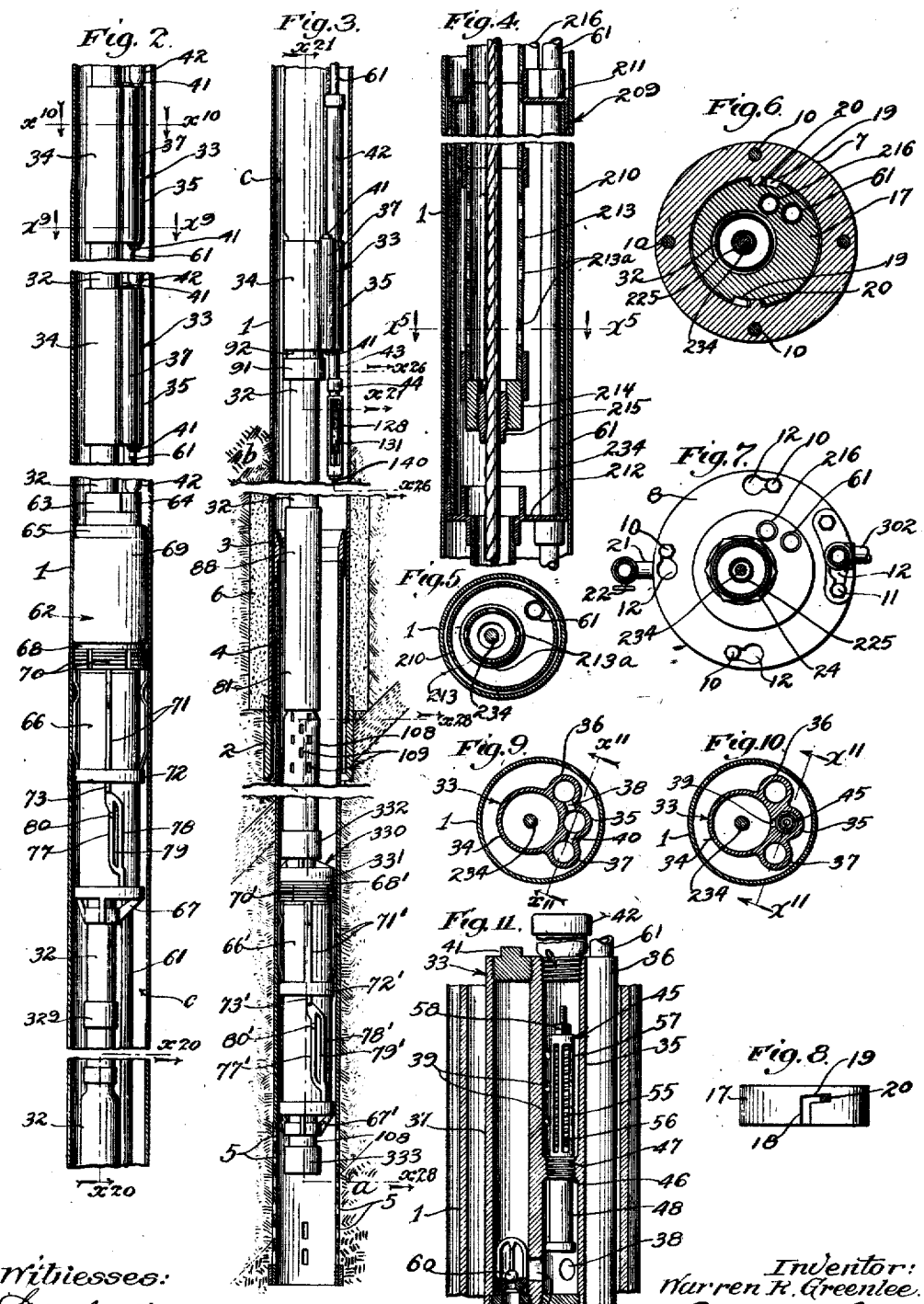
W. R. GREENLEE
WELL EQUIPMENT.
APPLICATION FILED JAN. 29, 1916.
1,312,442. Patented Aug. 5, 1919.
6 SHEETS—SHEET 2.

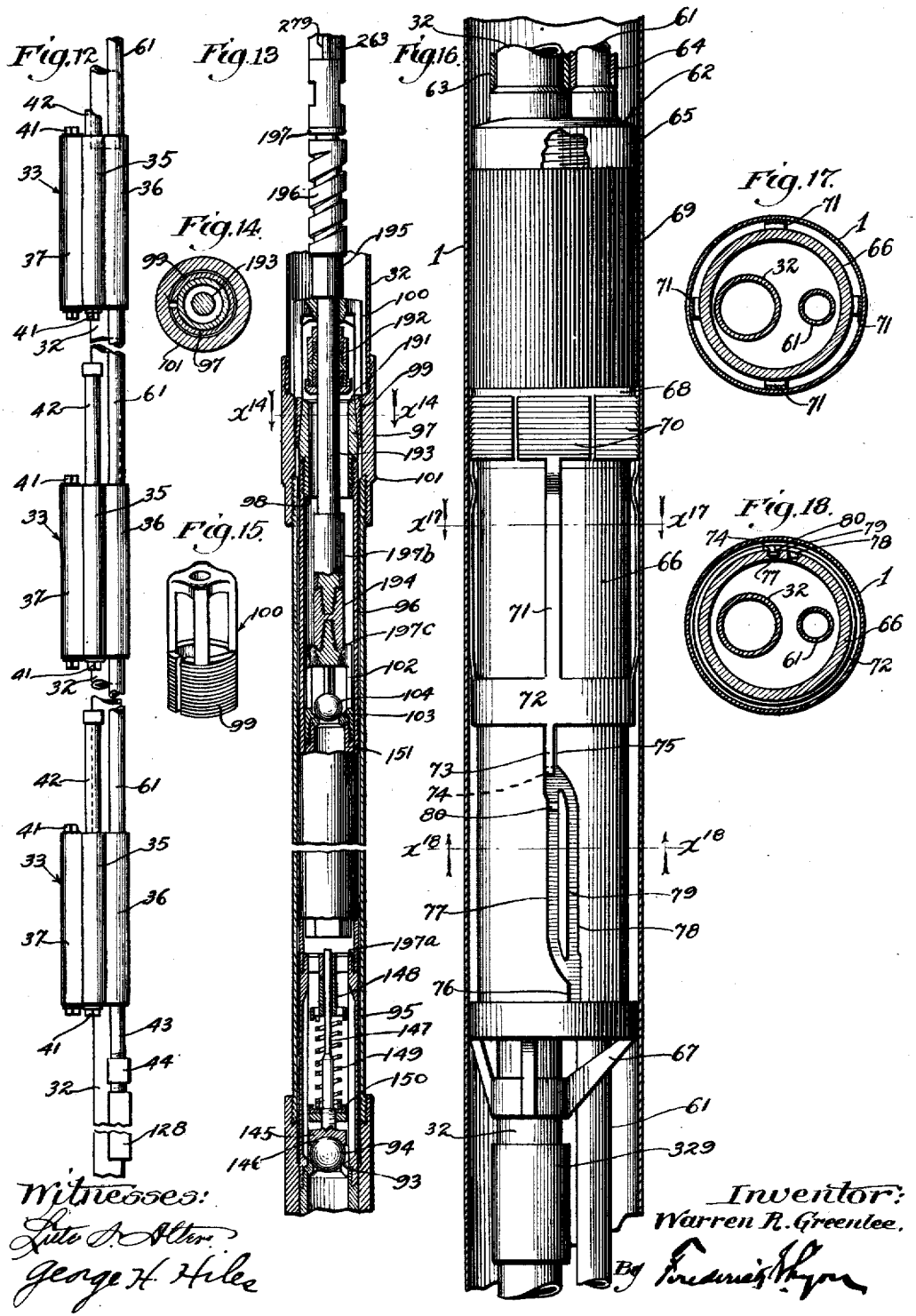

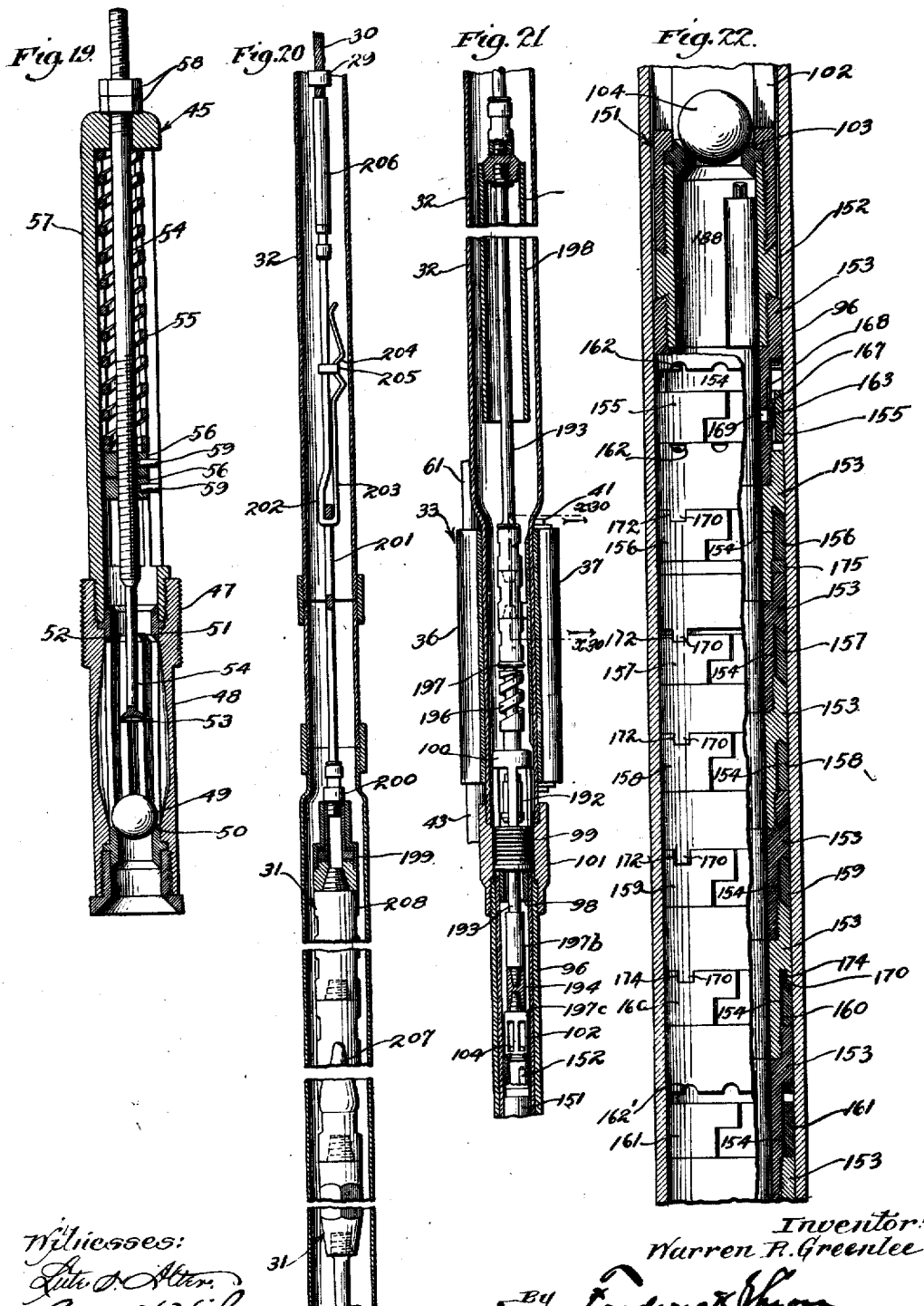

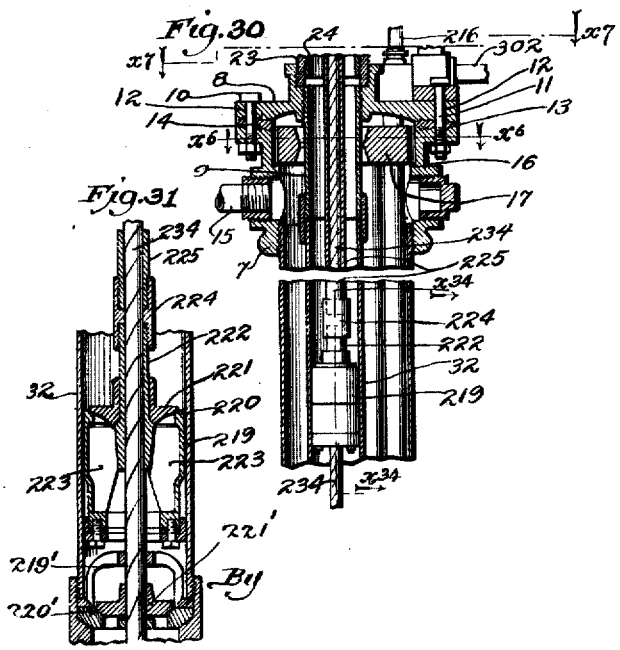

UNITED STATES PATENT OFFICE.

WARREN R. GREENLEE, OF PASADENA, CALIFORNIA.

WELL EQUIPMENT.

1,312,442.                Specification of Letters Patent.      Patented Aug. 5, 1919.

Application filed January 29, 1916. Serial No. 75,113.

*To all whom it may concern:*

Be it known that I, WARREN R. GREENLEE, a citizen of the United States, residing in Pasadena, in the county of Los Angeles and State of California, have invented a new and useful Well Equipment, of which the following is a specification.

In general, an object of this invention is to facilitate obtaining liquids from the earth. Another object is to cheapen the production of liquids such as oil and its associated products.

Another object is to effect the foregoing by making provision for control of the fluids to be tapped by the well while drilling, pumping and cleaning the well. This provision is made for wells pumped by piston pumps, flowing wells and also wells pumped by fluid from an external source.

Another object is to make provision for conserving all of the products given off through the well.

Another object is to make provision for utilizing to the maximum without wastage the hydrostatic and gas pressures in the producing strata.

Another object is to make provision for establishing and maintaining or renewing the ratio of gas and liquid volumes requisite to produce a flow.

Another object is to prevent plugging of the well by sand and mud.

It is understood that the terms "pump" and "pumping" define and imply any device and operation whereby liquid is caused to issue from the earth.

In some of the most prolific oil producing fields of the world, experience has shown that big producing wells cannot be pumped successfully because sand or mud invariably enters and chokes the valves, pump and tubing and even plugs up the well itself. This is especially the condition frequently found in the oil fields of California, and the fact that the wells in the California oil fields are usually of such great depth as well as being drilled into loose sand and shale makes the pumping of them the more difficult.

Without the use of this invention, when the oil together with a large volume of gas is contained in producing strata such as loose sand and shale, the head or rock pressure of the gas and oil for an interval of time drives said gas and oil through the sand and shale formation and into the well and the pressure is often so great that large quantities of the sand and shale, and in some instances mud, are carried into the well by the velocity of the oil and gas. The resistance that the well offers to escape of the oil and gas therefrom is less than the resistance which the oil and gas encounter in the rock or ground formation, hence after a great flow and heave of oil and gas into the well and therefrom and, after the head of oil is thus blown out of the well, the pressure in the well subsides for another interval of time until enough oil and gas is forced through the sand and shale to cause another flow. But before another flow can occur, the column of sand and mud, remaining in the well after the flow has ceased, settles down into the bottom of the well, packing the pump tubing and forming bridges and even choking the well solidly near the bottom. When there is water mixed with the oil, said water cuts the mixture and lets the sand settle quicker and the clean sand packs with extreme firmness.

After the interval of time of non-flow another heave or rush of oil, gas, sand and shale or mud occurs to fill the space left by the oil, sand and gas that has escaped into the well. The renewed pressure will do one of two things, either blow out the sand plugs and thereby enable the oil and gas to gush out of the well as before, or else, as is quite as often the case, said pressure compresses the plug of sand, shale and mud into a still tighter plug, thereby effectually plugging the well and stopping the production of oil therefrom until the well has been cleaned by the use of tools or until the pipes have been pulled. This cleaning of the well and pulling of the pipes is of such frequent occurrence that the cost of production of oil is often so great that even gusher wells frequently are not as profitable as smaller capacity wells.

To avoid the plugging, screening has been resorted to in many instances, but screening reduces the out-put of the well because holding back the sand retards the oil on account of the viscosity of the oil. It follows from this that to get a good flow of oil it is absolutely necessary to allow the sand and shale to enter the well with the oil and gas.

Another method whereby to get rid of the sand has heretofore been tried by use of the air lift but this method has certain disadvantages and cannot be applied to a well that will not flow because of lack of proper submergence and furthermore the power expended in the air lift makes the air lift method too expensive unless it is possible to produce a continuous flow, which is very seldom the case. Wells are often able to furnish more than enough gas under high pressure to flow all the oil that said wells can produce, and therefore to use the air lift with such wells is obviously a waste of power.

Hydraulic pumping has also been tried but since in hydraulic pumping the pressure of the hydraulic fluid is almost invariably greater than the rock pressure, the greater pressure causes sand bridges to be produced in the casing and thus partially or entirely plug up the well. Hydraulic pumping is also very apt to pack the mud and sand into the producing sands around the bottom of the well so tightly as to practically seal said sands and stop the flow of oil therefrom, the sealing being so effectual sometimes that it is impossible to dislodge it so as to allow the oil to again flow.

Only in comparatively few instances is there any relief from a badly sanded well, for cleaning it with tools and pulling the pump tubing only enable the well to flow temporarily and often the casing collapses or is broken off by the caving roof of the cavity created around the well, thus entailing additional expense in the redrilling thereof.

From the foregoing it is clear that at best most big producing wells entail tremendous expenses while they are big producers, such expenses often preventing the well from being profitable and involving the owner of the well in pecuniary losses.

It is clear that the difficulties outlined above are all due entirely to the uncontrolled pressures and great fluctuations in the velocity of the oil and gas flowing through the sands in the immediate vicinity of the well and in the well itself, and also to the fact that prior to this invention the fluctuations in the velocity have been entirely uncontrolled. To overcome these difficulties and others which may appear hereinafter I make provision whereby the velocity of the oil and gas will remain steady, constant and as uniform as possible and whereby the pressure in the well and the head or rock pressures will nearly balance one another. Inasmuch as the relative pressures control the velocities I am enabled by altering the pressures to obtain higher or lower velocities as desired.

This invention not only makes provision for controlling the pressures and velocities in a well but, also, makes provision for obtaining continuous flow of oil and gas in many instances, when such would not be the case without such provision, so as to minimize the liability of choking and plugging of the well and its equipment by sand, shale, mud and the like, and also minimize liability of packing the producing earth strata around the well.

It is noted that great oil gushers generally become extinct in a short time, and that this is due to the plugging and packing of the sand as outlined above is verified by the fact that good producing wells have been sunk close to extinct gushers.

Whether or not the wells are gushers or are ordinarily flowing or piston-pumped wells, said ordinary flowing and piston pumped wells intermittently have the same great pressures as the gushers and are therefore liable to be plugged up by sand and shale as above described unless provision is made for their control.

A further harmful effect of the alternate higher and lower pressures of the oil and gas flowing into the well and consequent rise and fall of the level of liquid in the well is that erosion of the walls of the well takes place, thus inducing caving-in of the walls and roof of the well cavity, such caving-in producing crushing or breaking of the casing so that shooting the well and then redrilling is necessary. This shooting and drilling operation further breaks up the formation and encourages caving. Even this operation is difficult in a great many instances for the sand often enters the well as fast as the tools can clean it out of the well, thus making it very difficult to cut the casing or even blow it off near the sand by blasting, and hence the greater portion of the string of casing is usually lost. A still further harmful effect of a blow-out is that when the great pressure due to the head of oil in the tubing is removed much of the gas in solution in the oil becomes free to expand and rise and escape therefrom, so that the oil subsequently filling the well is deficient in gas or "dead" and cannot flow for a comparatively long period of time.

To effect the foregoing objects and to overcome the difficulties outlined above there is provided either a pressure regulated valve or valves, such for instance as a diaphragm valve, at the top of the well; or pressure regulated valves at various levels in the well, or both, to establish, maintain or renew the ratio of liquid volumes and pressures or the ratio of gas and liquid volumes and pressures requisite to produce flow.

In some instances, when the valve is at the top of the well, it opens and closes at predetermined higher and lower pressures of gas in the well to open the oil discharge pipe and permit the oil to flow and to close the oil discharge pipe until the pressure reaches the predetermined higher pressure when the valve again opens to permit the oil to flow.

In other instances, when the valve is at the top of the well, it opens and closes at predetermined higher and lower pressures of gas in the well to admit fluid to and exclude fluid from entering the well from an outside source such as a gas well, compressor or pump.

In still other instances the two valves just mentioned may be combined to obtain all of the actions outlined in the two preceding paragraphs.

The valves at the top of the well may be suitable and satisfactory for a certain small class of wells and, though the well is under control and cannot blow out the head of oil so as to cause the difficulties hereinbefore set forth as resulting from the blow-out, yet for another larger class of well it is more desirable to place the valves at different levels in the well, and by so doing certain advantageous results are obtained that cannot be obtained by the valve or valves at the top of the well without complicating and increasing the cost of the equipment.

When the valves are placed at various levels in the wells, they automatically control entries at all of said levels, the flow of liquid taking place at one level or another according to the variations in the volumes and pressures of gas flowing to the well in some instances with the oil, or according to the variations in the volumes and pressures of fluid, either gas, or liquid, flowing or forced into the well in other instances at the top from an external source of supply.

At lower pressures the higher valve may have flowing submergence and in such event opens to admit the operating fluid to flow the well; and at higher pressures, when there is nonflowing submergence of said higher valve, the higher valve closes to exclude the operating fluid and the lower valve may then have flowing submergence and in such event opens to flow the well; and at still higher pressures, when there is nonflowing submergence of the lower valve, the lower valve closes to exclude the operating fluid. Closing of the valves and thus excluding the operating fluid from the pump tubing when there is nonflowing submergence of the valves insures that said operating fluid will be held in storage in the well to aid subsequent flowing of the well and prevents by its back pressure the harmful velocities and heaves hereinbefore referred to. Thus each valve shuts to exclude the operating fluid when there is nonflowing submergence of said valve and if said fluid is a gas prevents blowing off and wastage of said gas and dissipation of its energy. One advantage of what I term plural or multiple entries is that, when the gas pressure is low in the well and the oil level is comparatively high, the well will flow with lesser submergence than otherwise required, thus enabling the well to be flowed by low pressure fluids. This is of course a great economy and is also of advantage in starting a well to flow.

From this it is seen that low pressure gases and small volumes of gas can be utilized to effect flowing, and that, no matter how low a pressure of gas is furnished by a well, said gas is effective in displacing an equivalent volume of oil and thereby reducing the load on the piston in a piston-pumped well in proportion to the amount of the displacement.

Other advantages of the plural or multiple entries are that in a piston-pumped well no free gas can enter the pump and thereby reduce the output of the well and the gas cannot enter the pump cylinder and keep the valves closed so that the pump piston will merely work against a gas body.

Another advantage of the plural entries is that with deep submergence and small volumes of high pressure gas, when the smaller volumes of high pressure gas change to larger volumes of low pressure gas, said low pressure gas becomes available to flow the well.

Heretofore to obtain at the start the greatest pumping efficiency it has required trials at different submergences, and it follows from this that to maintain the greatest efficiency it would be necessary with prior devices to raise and lower the pump to meet all variations in the level of the liquid in the well. By the plural entry construction the pump is self adjusting to the different levels and pressures and therefore the pump is always working under maximum efficiency.

By maintaining the gas pressure it is clear that all of the gas dissolved in the oil is held in solution, so as to insure that the well will always contain "lively" oil capable of hastening the flow.

Provision is made for draining or flushing out the tail pipe so that when the pump is raised the oil therein will flow out of the pump and so that any sand clogging the pump can be readily flushed out by merely lifting the pump off of its seat. To accomplish this there is provided a puppet valve normally closed when the pump is in operation and adapted to be opened by the weight of the column of oil above it when the pump is raised.

Heretofore oil wells were each equipped with a string of tubing and a rubber packing near the lower end of the tubing so as to cause all of the gas to flow into the string of tubing and thus displace and flow the oil. Thus heretofore there was no control or utilization of the gas to produce a steady flow of the liquid in the well so as to prevent the rush of gas and consequent plugging of the well and producing sands there-around as hereinbefore outlined, and there has been no provision for conserving the natural rock pressure in the gas fields. The gas has been allowed to come out of the well at random so as to bring the oil with it and after the head of oil blew out the gas was allowed to blow off until the oil accumulated for further flow. The intermediate nonflowing periods entailed the loss of a tremendous amount of energy besides the risk of producing sanding of the well and tubing and shortening the life of the well. After the rock pressure was allowed to waste away expensive pumping was often resorted to to obtain the oil left dead in the well.

In carrying out this invention, in order to obtain full control of the pressures and velocities, I first insure perfect sealing of the well. Wells have not heretofore been perfectly sealed and this is substantiated by the fact that water wells several miles away from an oil field have been contaminated by seepage of oil and gas from the oil wells through the nonproducing strata above the oil sand to the water wells. The casing above the producing strata is surrounded by a sealing ring of cement or the like.

I provide either a gas-tight casing head at the top of the well or a packer set at an intermediate point in the well so as to form a pressure-fluid reservoir between the casing and tubing below the casing head or packer as the case may be. The gas or other operating fluid is taken from the reservoir as needed to displace the oil in the tubing and cause the same to flow out of the well, and if gas is the operating fluid being used any gas in excess of what is necessary to cause the oil to flow at a velocity that can be readily taken care of is discharged and utilized in another well or wells having insufficient volumes of gas to displace the oil and cause the same to flow. Thus the reservoir forms a gas trap or receiver adapted to contain an elastic cushion of gas that insures against violent changes of pressure at all times, thus preventing excessive sand and mud heaves and consequent plugging and clogging of the well, its equipment and the producing sands.

A comparatively slight displacement of oil between the casing and tubing by the pressure of gases in the reservoir causes much greater displacement of the oil in the tubing so that it will rise therein, the level rising until the weight of the column of oil in the tubing balances the pressure of the gas in the reservoir or gas trap. The weight of the oil and the gas pressure continue to balance one another until sufficient oil accumulates in the well to cause flowing submergence, whereupon the oil will flow in a manner well understood.

Thus it is clear that if the well at all times furnishes the requisite amount of oil and gas to produce a flow, said flow with this invention will be steady and continuous. This invention makes it possible to conserve the much needed gas in the well at the precise moment it accumulates in greatest abundance, and unless such provision were made said gas would blow out to little or no purpose, the blow out of gas occurring just before and after the head of oil has been blown out of the well. Such total release of the pressure in the well and on the sand near it allows an inrush of gas which is lost and a flow of oil with such violent velocity as to result in the disastrous sanding and other objectionable results hereinbefore outlined. Even when there are no shifting sands to plug the well, the well without this invention remains dead until sufficient gas collects to cause flowing pressure.

The distance above the sand at which the gas entry or entries are located determines the depth of submergence and also determines the weight of the fluid or equivalent gas pressure carried by the well to be utilized to balance the rock pressure. To prevent gas blow-outs the length of the tail pipe in some instances is made directly proportional to the pressure desired to be carried by the reservoir.

The regulator or entry valves are so constructed as to automatically control the volume of gas or other operating fluid passing through said valves and furthermore are so constructed as to regulate said volume and maintain the ratio of the operating fluid and oil volumes, the ratio of said volumes remaining the same but the rate of flow changing according as the total volume of the operating fluid and oil is greater or less.

To positively insure against blowing out of the head of gas from the reservoir, I provide for those wells having relatively high gas pressure float valves adapted to open and close according to the height of the liquid level between the casing and tubing.

One of said float valves on the lower end of the conductor tube for the operating fluid closes when the liquid level rises to exclude liquid from the conductor tube and opens when the liquid level falls to admit gas to said conductor tube.

Another of said float valves on the lower end of the pump tubing opens when the liquid level rises to admit liquid to the tubing and closes when the liquid level falls to exclude gas from said tubing.

If with the use of this invention the flow of oil ceases because of insufficiency of either oil or gas or both, there is always a possibility of sand in the oil in the tubing settling down and bridging across and plugging the tubing. If this occurs, another great advantage of the valved multiple entries becomes evident, for by releasing some of the gas at the top of the well and thus reducing its pressure an entry above the sand plug will open and admit oil to the tubing and another entry or entries higher up will open to admit gas which will cause the oil above the plug to flow. The weight of the oil column above the sand plug will thus tend to be gradually diminished and when it is so diminished said sand plug will be blown out by the pressure of oil and gas beneath it. If there is flowing submergence and the pressure of gas is so great as to close the valves at all of the entries, then some of the gas may be released at the top of the well from the reservoir to lower the pressure sufficiently to allow the head of oil in the tubing by its weight to open the lower valve so that the oil will flow.

It is understood that, when fluid under pressure is supplied to the well from an external source to effect the pumping or flow of the liquid tapped by the well, said fluid may be gas taken directly from another well under pressure or may be gas from a compressor and this gas may be compressed air, or said fluid may be a liquid taken from the well itself or taken from an outside source.

Heretofore the gas in the well rising with the oil and discharging therewith resulted in waste of power for, if the oil was not discharged against pressure greater than atmospheric, the gas expanded and so lost its expansive energy; and, if the oil was discharged against said greater pressure, as is often the case, then the pump had not only to work against the head of oil in the tubing plus the atmospheric pressure but against said head plus the greater pressure. To avoid such waste of power I provide means in the form of a gas trap to separate the gas from the oil and remove its pressure from the oil, thereby maintaining the gas under whatever pressure it has at the point of discharge of the oil without causing back pressure of the gas against the oil.

The accompanying drawings illustrate apparatus embodying the invention:

Figures 1, 2 and 3 are elevations mainly in vertical mid section of the upper intermediate and lower portions of one form of apparatus embodying the invention, portions being broken away to contract the views.

Fig. 4 is an enlarged broken sectional elevation of the well gas trap in Fig. 1, a portion of the casing also being shown in section.

Fig. 5 is a plan section on line indicated by $x^5$—$x^5$, Fig. 4.

Fig. 6 is a plan section on line indicated by $x^6$—$x^6$, Figs. 1 and 30.

Fig. 7 is a plan view partly in section on line indicated by $x^7$—$x^7$, Figs. 1 and 30.

Fig. 8 is a side elevation of the casing head ring in Fig. 30, showing the slot and the lug of the casing head engaging said slot, said lug being in cross section.

Figs. 9 and 10 are plan sections on lines indicated by $x^9$—$x^9$ and $x^{10}$—$x^{10}$ respectively, Fig. 2.

Fig. 11 is an enlarged fragmental sectional elevation on line indicated by $x^{11}$—$x^{11}$, Figs. 9 and 10.

Fig. 12 is an elevation of the entry members in Figs. 2 and 3 and the elements associated therewith, portions of the pump tubing and fluid conductor being broken away to contract the view.

Fig. 13 is an elevation mainly in mid section of the parts of the inserted pump extending from the ring contractor to the upper end of the piston rod.

Fig. 14 is a plan section on line indicated by $x^{14}$—$x^{14}$, Fig. 13.

Fig. 15 is a perspective view of the novel cage in Fig. 13.

Fig. 16 is an enlarged side elevation of the packer in Fig. 2, the portion of the casing that incloses said packer also being shown in section.

Figs. 17 and 18 are plan sections on lines indicated by $x^{17}$—$x^{17}$ and $x^{18}$—$x^{18}$ respectively, Fig. 16.

Fig. 19 is an enlarged sectional detail of one of the entry regulators or valves.

Figs. 20 and 21 are broken elevations partly in section on line indicated by $x^{20}$—$x^{20}$ and $x^{21}$—$x^{21}$, Figs. 2 and 3.

Fig. 22 is an enlarged elevation partly in section of portions of the pump cylinder and piston together with the piston rings.

Fig. 23 is an enlarged sectional detail of the pump seat and the parts adjacent thereto.

Fig. 24 is a sectional detail of the novel ring contractor on line indicated by $x^{24}$—$x^{24}$, Fig. 25.

Fig. 25 is a plan section of the ring contractor on line indicated by $x^{25}$—$x^{25}$, Fig. 23.

Fig. 26 is an enlarged elevation mainly in section on line indicated by $x^{26}$—$x^{26}$, Fig. 3.

Fig. 27 is a plan section on line indicated by $x^{27}$—$x^{27}$, Fig. 26.

Fig 28 is an enlarged sectional elevation on line indicated by $x^{28}$—$x^{28}$, Fig 3, the tubing support and the casing being omitted.

Fig. 29 is a plan section on line indicated by $x^{29}$—$x^{29}$, Fig. 28.

Fig. 30 is an enlarged broken detail at the upper end of the casing, the casing head and its parts being in section and the auxiliary pump piston being in elevation.

Fig. 31 is an enlarged sectional detail on line indicated by $x^{34}$—$x^{34}$, Fig. 30.

Fig. 1$^a$ is an enlarged vertical section of the stuffing boxes and adjacent parts, the valve plug on the sucker line also being shown.

Fig. 23$^a$ is a plan section on line indicated by $x^{23a}$—$x^{23a}$, Fig. 23, with the pump inserted in its seat.

It is understood that all connections are screw-threaded, said connections being so small in some of the views as to preclude showing of the screw-threads in all instances.

Referring to the drawings, there is provided a well casing or conductor tube 1 having at its lower end a casing shoe 2 and having internally near said casing shoe an adapter or guide 3 to which is attached a liner 4 provided with perforations 5 through which the oil may flow into the well from the oil sand indicated at $a$.

To form a perfect seal above the oil sand $a$ and thereby prevent seepage of oil and gas from the oil sand into the strata $b$ above the oil sand, there are provided sealing means around the lower end of the casing, said sealing means being shown in the drawings in the form of a ring 6 of cement or other suitable material.

The upper end of the casing 1 is fastened to a casing head 7 provided with a lid 8 which is screw-threaded onto a tubing nipple 9, see Fig. 30, and fastened in place by bolts 10, 11 passing through slots 12 in the lid 8, said slots being larger at one end than the other so as to readily admit the bolt head at the wider end of the slot and so that when the bolt head is at the narrow portion of the slot the lid will be held against upward movement. Thus the lid may be very quickly detached and replaced. The adjacent faces of the casing head 7 and lid 8 are provided with wedge shaped annular corrugations 13 so as to make gas-tight joints with the packing 14 inserted therebetween. The casing head 7 is provided with a nipple 15. Interiorly of the casing head 7 and resting on an annular shoulder 16 is a casing head ring 17 adapted to form a seat for an elevator, or the like, not shown. The casing head ring 17 is tapered on its inner face outwardly from the intermediate portion toward its ends, said tapering being of advantage to guide the pump tubing collars through the casing head ring so as to prevent said collars from lodging against the ends of the ring and thereby prevent movement of the pump tubing in lowering and raising said tubing.

The casing head ring 17, see Fig. 8, is provided with an angular slot formed by a vertical slot 18 and a slot 19 extending aslant upward from the upper end of the vertical slot to engage a lug 20 projecting from the inside face of the casing head 7, see Fig. 6. By turning the ring 17 in the appropriate direction the ring is tightened down on the shoulder 16.

The casing head 7 is connected by the nipple 15 to a pipe 21 provided with a valve 22. Into the lid 8 is screw-threaded a bushing 23 provided with a nipple 24 which is connected to a discharge T 25 having above its outlet 25$^a$ a gate valve 25$^b$ provided at its upper end with a flange 26 to receive a stuffing box 27 forming at its lower end a seat 28, see Fig. 1$^a$, adapted to be engaged at certain times by a valve plug 29 mounted on a sucker line 30, in this instance the greater portion of said sucker line being in the form of a cable. The valve plug 29 is located above the tools 31 so that when the tools are drawn up to the top of the well the plug 29 will engage the seat 28 and thereby prevent the oil from flowing into the stuffing box 27.

From the foregoing it is clear that gas-leakage from the well-equipment is prevented.

Inside of the casing 1 and surrounding the sucker line 30 is a sectional fluid-discharge tubing 32 connected to the nipple 9 and provided at intervals therealong with operating-fluid entry members 33, shown more clearly in Figs. 9, 10, 11 and constructed as follows: Each entry member comprises a barrel 34 into which is screw-threaded the adjacent ends of sections of the tubing 32 so as to form a continuous tubing, and also comprises a valve jacket 35 and an inlet passage 36 and a check-valve chamber 37, said valve jacket and inlet passage 35, 36 communicating with one another through a port 38 and said valve jacket communicating with the barrel through ports or entries 39 and said valve jacket and check valve chamber communicating with one another through a port 40. The ports or entries 39 at the different valve levels constitute what I term plural or multiple entries. The lower ends of all of the valve jackets 35 and the upper ends of the check valve chambers 37 are closed by plugs 41, and each of said valve jackets is provided at its upper end with a reservoir 42 to hold an elastic body of gas so as to minimize shocks and vibrations on the well equipment and stabilize the flow of oil. The lowermost inlet passage 36 may be connected by a nipple 43 to a check valve 44 to allow gas to enter said passage and prevent outflow of fluid. Each of the valve jackets 35 is provided with a valve 45 best shown in Fig. 19 and said valve may be constructed as follows: Each of the valve jackets 35 is threaded at 46 to engage the threaded bushing 47 of the valve, said bushing being on the upper end of a longitudinally ribbed ball chamber 48 provided with a valve ball 49 adapted to close on to a lower seat 50 in its lower position and adapted to close on to an upper seat 51 in its upper position. The upper seat 51 may be provided with means such as notches 52 to allow a slight flow of the operating fluid so that if the well is not discharging liquid any sand in the liquid will be agitated sufficiently to prevent the formation of bridges and plugs. To close on to the upper seat 51, each ball 49 must first strike the lower cupped end 53 of a stem 54 and move said stem against the pressure of a coil expansion spring 55 seated at one end against tension-adjusting nuts 56 adjustable along the stem 54, said spring being seated at its opposite end against the upper end of a cage 57 that surrounds said spring, and the stem 54 is screw-threaded at its upper end to adjustably engage an abutment formed by nuts 58, one of which engages the adjacent end of the cage 57 to maintain the cup 53 at a predetermined distance from the valve seat 50, said nuts 58 being designed to be engaged by a tool, not shown, to turn the stem 54 and thereby adjust the nuts 56 along said stem to increase or diminish the tension of the spring 55, said nuts 56 being held against turning by pins 59 projecting from said nuts between adjacent ribs of the cage 57. The cage 57 is screw-threaded at its lower end into the bushing 47.

Each ball chamber 48 is inwardly tapered from its middle portion toward its ends so that the inside diameter is gradually reduced from its middle portion to the valve seats 50, 51.

Each of the check valve chambers 37 is provided at its lower end below the level of the port 40 with a ball check valve 60 said valve operating to admit fluid from the casing 1 to the check-valve chamber but preventing back discharge of fluid from said chamber into the casing so as to prevent back pressure of the operating fluid against the fluid in the producing sands.

Adjacent passages 36 are connected to one another and the topmost gas passage 36 is connected with the casing head lid 8 by sections of an operating-fluid conductor tube 61 so as to form a straight continuous conductor for gas or liquid to pump the liquid in the pump tubing.

The space between the casing 1 and tubing 32 forms a gas reservoir, trap or receiver c of which the top may be formed at the top of the well by the casing head lid 8 or may be formed at any desired intermediate portion of the well by a suitable packer 62 as in Fig. 2.

From the foregoing it is seen that the valve balls 49 are normally closed on the seats 50 when there is not more than enough pressure of the operating fluid to overcome the pressure of the column of liquid in the pump tubing above the balls of the respective valves, thus preventing liquid and sand from backing down through the ports 39 and thence through these valves which then also function as check valves; and that each valve will open under pressures of said operating-fluid sufficient to displace the liquid above it; and that said operating-fluid will discharge upward and inward through the ports 39 into the tubing 32 to flow the liquid in the tubing when there is flowing submergence of the valve; and furthermore that if the pressure of the operating fluid is sufficient to force the ball 49 against the pressure of the spring 55 and the weight of liquid in the tubing above the ball to close onto the seat 51, such closure of the valve will prevent said operating-fluid from entering the tubing in any substantial volumes.

The check valves 60 will allow fluid to pass from the interior of the casing 1 to the check valve chambers 37 and prevent fluid from discharging from said chambers into the casing.

The tapered ends of the ball chambers 48 have this effect, that if the pressure of gas is just sufficient to raise the ball 49 a slight distance above its seat 50 against the weight of liquid in the tubing 32 a comparatively small volume of said operating-fluid will flow through the valve thus conserving the supply of said fluid and effecting a comparatively small flow of liquid in the tubing; that if the pressure of the operating-fluid is higher and thereby raises the ball to the intermediate portion of the ball chamber, where said chamber is of greatest diameter, against the weight of liquid in the tubing a much greater volume of the operating-fluid will flow through the valve to effect a greater flow of liquid; and furthermore that if the pressure of the operating-fluid is still higher, in fact so high as to endanger blowing out the head of liquid in the tubing, said still higher pressure will act to raise the ball against the expansive force of the spring 55 and the weight of liquid in the tubing above the ball into the reduced portion of the ball chamber to diminish the flow of the operating fluid or, if said still higher pressure is greater than can safely be used without blowing out the head of liquid in the tubing, then the still higher pressure will act to shut the ball onto the seat 51 to exclude all but a relatively minute volume of operating-fluid from the pump tubing at the entry thus shut off. It is understood that, owing to the load of liquid on the valves being greater the lower the valve is, the valves may open and close successively so as to maintain the ratio of operating-fluid and liquid volumes, though the rate of flow may change according as the total volume of the operating-fluid and liquid being pumped is greater or less.

The packer 62 may be of any suitable construction but there is shown in Figs. 2, 16, 17 and 18, a packer constructed as follows: The tubing 32 and conductor tube 61 are provided with ground-joint collars 63, 64 respectively tapered to fit on the tapered ground seats of a packer head 65 through which the tubing and conductor tube pass. The head 65 is screw-threaded onto the upper end of the packer barrel 66, which is provided at its lower end with a cage 67. A slip ring 68 forming a conical frustum surrounds and is shiftable on the barrel 66, and a packer ring 69 of rubber or the like is inserted between the head 65 and said ring. Below the slip ring 68 are provided slips 70 connected by bow springs 71 to a band 72 surrounding the packer barrel and shiftable therealong. The spring band 72 is provided with a resilient arm 73 bent at its free end to form a detent 74 adapted to slide in a guide or groove comprising end portions 75, 76 and parallel spaced apart intermediate portions 77, 78 separated from one another by a longitudinal tongue 79. The grooved portions 75, 76, 77 and 78 together form a switch, and the grooved portion 77 is provided with an abutment 80 adapted to be engaged by the detent 74 to hold the slips 70 retracted when the packer is being lowered into position in the well. When it is desired to set the packer, the barrel 65 is raised, the bow springs 71 at the same time acting to hold the detent 74 stationary so that the groove portion 77 will move out of engagement with the detent and the portion 76 into engagement, whereupon the barrel will again be lowered to cause the groove portion 78 to run down along the detent, thus bringing the groove portion 75 into engagement with the detent as in Fig. 16 to wedge the slip ring 68 against the slips 70 to compress the packer ring 69.

The foregoing described construction can be used for self flowing wells, wells flowed by gas or liquid from an external source, and can also be used for a well in conjunction with a piston.

The pump tubing 32 is provided at its lower end, see Fig. 23, with a seat member 81 having a ground tapered seat 82 in which is seated the complementary tapered portion 83 of a sectional foot comprising sections 84 having ground tapered joints 85 and also comprising expansion rings 86 inserted between annular shoulders 87 and the ends of the adjacent sections. Adjacent sections 84 are screw-threaded into one another.

The seat member 81 is extended upward, see Figs. 23, 24, to form a tubular ring contractor 88 having interiorly one or more downwardly and inwardly tapered downwardly expanding projections 89 designed to engage the rings 86 to compress them into the grooves when the sectional foot 84 is lowered to seat on the seat 82.

This construction may be used wherever it is necessary to compress split expansion rings into their grooves.

The seat member 81 is provided at its upper end with a tapered joint 90 and is screw-threaded to engage the lower end of a section of the tubing 32 which section is connected at its upper end by a collar 91 to a nipple 92, said nipple being screw-threaded into the lower end of the lowermost entry barrel 34. The foot 84 is provided at its upper end with a valve seat 93 for a standing or suction valve ball 94, said valve seat being inserted between the foot and a cage 95. The upper end of the cage 95 is screw-threaded into the lower end of a cylinder or working barrel 96 which is screw-threaded at its upper end onto a hollow upwardly and inwardly tapered mandrel 97 forming a shoulder 98 inside of the working barrel.

The tapered face of the mandrel 97 engages slips 99 of a cage 100, see Fig. 15, so that when said cage is forced toward the mandrel said mandrel will expand the slips against a collar 101 which forms a portion of the tubing and is screw-threaded onto adjacent tubing sections 32 so as to hold the working barrel against upward movement, said collar being of a somewhat less diameter than the tubing sections adjacent the top of the collar.

The working barrel 96 is provided above the standing valve with a valve cage 102 having a seat 103 at its lower end for a traveling or discharge valve ball 104.

The pump foot 84, see Fig. 23, is provided in its lower end with a slot or slots 105 designed when said foot is seated in its seat 82 to engage a lug or lugs 106 projecting from the inside face of the seat member 81 just below the tapered seat, said slots and lugs functioning to prevent relative turning between the cylinder and the pump seat.

The seat member 81 is provided with a tail pipe 107 surrounded by a gas excluder tube 108 which is spaced apart from the tail pipe and which is screw-threaded into the lower end of the seat member 81, see Figs. 23, 28. Said gas excluder tube 108 is provided with perforations 109 to allow entrance of the liquid being pumped. Any gas reaching the interior of the gas excluder tube 108 will escape through a bleeder duct 110 provided for that purpose in the seat member 81, said duct communicating with the upper end of the excluder tube as clearly shown in Fig. 23. The perforations 109 are adjacent the upper end of the tail pipe 107; and the lower end of the gas excluder tube 108, which may be in sections as shown in Fig. 28, is below the level of the lower end of the tail pipe. The perforations 109 are relatively long narrow slits which may be formed by milling, this construction excluding relatively coarse material which otherwise would be carried through the perforations by the liquid being pumped.

The lower end of the gas excluder tube 108 is provided with an annular seat 111 normally engaged by a drain or outlet valve 111$^a$ so as to allow for discharge of liquid and especially of sand from the interior of said tube when the cylinder is raised to clean out the pump, there being a coil spring 111ᵇ tending to hold the valve on its seat.

The tail pipe 107, see Fig. 28, is screw-threaded at its lower end into the upper end of a float chamber 112 having a passage way 113 and having in one side a recess 114 to accommodate a float 115 that is provided at its upper end with a guide rod 116 working in a guide 117 of the float valve chamber. The float 115 is provided at its lower end with a valve stem 118 which controls a balanced valve, said valve in this instance comprising a valve plug 119 to close a port 120 opening from the bottom of the recess 114 to the passage 113, and also comprising a valve plug 121 to close a port 122 that opens from the passage way 113 through a partition 123 near the lower end of the tail pipe. Higher liquid level raises the float 115 to open the valves 119, 121, and lower liquid levels allow the float 115 to descend so as to close said valves. The partition 123 is provided with a valve seat 124 closed by a valve plug 125, there being a coil spring 126 tending to keep said valve plug closed on the valve seat.

The check valve 44 is screw threaded at its lower end on to a nipple 127 which is screw threaded into the upper end of a float valve chamber 128. The float valve chamber 128 is provided with a passage 129 and is provided in one side with a recess 130 to accommodate a float 131. The float 131 is provided with a suitable balanced valve and in the instance shown in the drawings, see more particularly Fig. 26, the upper end of the float 131 is provided with a valve stem 132 working in a guide 133 and is provided at its lower end with a piston rod 134. The valve stem 132 is provided with a valve plug 135 to close a port 136 opening through the upper end wall 137 of the recess, and said piston rod 134 is provided with a piston head 138 working in a cylinder 139, said cylinder communicating at its upper end with the recess 130 and communicating at its lower end with the passage 129. The lower end of the float valve chamber 128 is closed by a plug 140 or equivalent. The float 131 rises and falls according to the liquid level to close and open the valve 135. Thus the float 131 and its valve 135 work just the opposite to the float 115 and valves 119, 121 operated by the float 115.

The function of the float 115 and its valves 119, 121 is to allow liquid to enter the ports 120, 122 at predetermined liquid levels and to close the ports 120, 122 when the liquid falls below a predetermined level, thus preventing gas from entering the tail pipe by way of the ports 120, 122 and passage 113. The float 131 and its valve 135 function to open the port 136 when the liquid falls below a predetermined level so as to allow gas to pass through the port 136 and thence through the check valve 44 and nipple 43 into the lowermost gas passage 36 and thence into the conductor tube 61 to the other entry members, and function to close the port 136 when the liquid rises above a predetermined level, thus preventing said liquid from entering the gas passages 36 as is readily understood.

The suction valve ball 94 is engaged by a discharge pressure piece 145 having a semi-spherical seat 146 to accommodate a portion of the spherical surface of the valve ball. The pressure piece 145 is provided with a stem 147 working in a guide 148 in the interior of the valve cage 95, there being a coil spring 149 between said guide 148 and a nut 150 adjustably screw threaded on to the stem 147. The spring 149 thus functions to tend to keep the valve ball 94 on its seat 93 and the advantage of this is that the well pressure will be maintained above a pressure predetermined by the strength of said spring. This minimizes the requisite length of the tail pipe 107.

Working in the cylinder 96 is a piston indicated in general at 151, the valve cage 102, valve seat 103 and valve ball 104 previously described forming portions of said piston. The hollow piston body may be formed by a section 152 and by a plurality of other sections 153 all screw threaded together, see more especially Fig. 22 of the drawings. The piston 151 is provided with annular grooves 154 to accommodate piston rings 155, 156, 157, 158, 159, 160 and 161 respectively, it being understood that these piston rings may be alike or may be of different construction as will be presently described. The upper and lower edges of one of the grooves 154 are provided with notches 162 and said groove is wider than its ring 155 so that downward movement of the piston will seat said ring against the upper edge of said groove and upward movement of said piston will seat said ring against the lower edge of said groove as in Fig. 22. The piston ring 155 is provided with a leaf spring 163 fastened circumferentially of the inside face of said ring by rivets 164, 165, the rivet 165 projecting through a slot 166 in said spring so as to allow for contraction and expansion of said spring. The spring 163 is provided with a slide valve 167 slidable in a groove 168 in the piston body, said slide valve being adapted to open and close a port 169 in the piston body when the ring 155 is in its upper and lower positions respectively relative to the upper and lower edges of the piston groove. Thus it is clear that on up stroke of the piston the port 169 will be closed and that on down stroke of the piston said port will be open so as to allow liquid from above the discharge valve 104 to enter the piston and cylinder to displace any gas therein, the next succeeding stroke of the piston forcing the displaced gas through the discharge valve. This insures the piston from working ineffectually against a body of gas and thus maximizes the pumping effect.

The grooves for the piston rings 156, 157, 158, 159 and 160 have tongues 170 provided with undercut faces 171, said undercut faces for the grooves of the rings 156, 157, 158 and 159 being outwardly and downwardly beveled and said undercut faces for the rings 160 being vertical. The rings 156, 157, 158, 159 are provided in their upper edges with notches 172 having beveled faces 173 to fit the beveled faces 171; and the upper edge of the ring 160 is provided with notches 174 to accommodate the tongues 170 of the groove for the ring 160.

The upper edges of the grooves 154 form annular shoulders or ring seats on the outside of the sections 153 and the rings 155 to 160 inclusive are accommodated between said shoulders and the screw threaded ends or other ring seats of the adjacent sections, the sections being taken apart for inserting and taking out the rings and being tightened together to hold said rings in place.

The groove for the ring 156 is provided with an annular seat member 175 screw threaded on to the screw threaded end of the section having said groove, the lower edge of the ring 156 seating against said seat member on the up stroke of the piston. This facilitates repair of the piston when the ring seat becomes worn.

The piston section 152 is screw threaded at one end into the discharge valve cage 102 and is screw threaded at its lower end into the uppermost section 153 and is provided at one side with a port 176 opening into a valve chamber 177, there being a valve plug 178 in said valve chamber to close on to an annular seat 179. The valve plug 178 is provided with a cage 180 to hold a valve ball 181 adapted to close on to a seat 182 positioned inside of said valve plug 178. The valve plug 178 is hollow and its interior communicates through a tube 183 with a piston 184 working in a cylinder 185 which communicates at its lower end with the valve chamber 177 and which communicates at its upper end with a spring chamber 186 having therein a coil spring 187 that presses against the piston 184 to tend to seat the valve plug 178 on its seat 179. The spring chamber 186 communicates at its upper end with the passage 188 through a port 189 controlled by a valve ball 190.

When the piston 151 is operated against liquid only, liquid will occupy the spring chamber 186 and will prevent opening of the valve 178, but if there is gas in the cylinder 96, gas will displace the liquid from the chamber 186 and said gas being compressible will be compressed on the down stroke of the piston 151 by reason of the overbalancing fluid pressure against the valves 178, 181 which pressure closes the valve 181 and opens the valve 178 to allow liquid from above the discharge valve 104 that has entered the chamber 177 through the port 176 to flow from said chamber 177 into the interior of the piston 151 to displace gas therein, said gas being forced through the discharge valve 104 on the down stroke of the piston.

The mandrel 97 is provided at its upper end with a valve seat 191 to receive a valve 192 which is shiftably mounted on a piston rod 193 that is connected by a coupling 194 to the discharge valve cage 102. The valve plug 192 is positioned inside of the cage 100 and said piston rod 193 passes through said cage and is provided with an abutment in the form of a collar 195 shiftably mounted on said piston rod and adapted to strike the upper end of the cage 100 to force the slips 99 into tight engagement with the collar 101.

Surrounding the piston rod 193 is a coil spring 196 having its lower end resting on the collar 195 and compressible between said collar and an abutment in the form of a shoulder 197 on the piston rod, the function of said spring being to allow the lower end of the piston to strike an abutment formed by an annular shoulder 197$^a$ at the upper end of the cage 95 when the pump is being inserted in its seat so that the slips 99 will not be set up tightly before the foot member 84 is fully seated in the seat 82.

To pull the pump the piston rod 193 will be raised to bring an abutment in the form of a sleeve 197$^b$ surrounding said piston rod, into engagement with the valve 192 to raise said valve into engagement with the top of the cage 100 to loosen the slips 99, and said piston rod will be further raised to cause an abutment 197$^c$ formed by the upper end of the cage 102, to strike the abutment 98 and thereby raise the pump cylinder with said piston rod.

The piston rod or sucker rod 193 is provided above its abutment 197 with an elastic fluid reservoir 198 closed at its upper end and open at its lower end, said reservoir reciprocating with the sucker rod so that on its down stroke gases or air contained in said reservoir will be compressed by the liquid being pumped so as to minimize shocks on the well equipment. The reservoir 198 owing to the expansion of the gases or air therein on its up stroke tends to produce a steadier flow of the liquid being pumped than would take place if said reservoir were not provided.

The upper end of the tools 31, see Fig. 20, is screw threaded into a swivel socket 199 connected by a threaded coupling member 130

200 to an eye 201 which is engaged by a hook 202 provided with a resilient spring member 203. The spring member 203 is provided with a crook or bend 204 to retain a slip ring 205 that surrounds the hook. The hook 202 is connected to a bar 206 forming a weight and forming a portion of the sucker line.

If the piston becomes stuck in the pump, the sucker line may be first disengaged therefrom by lowering the sucker line until the top of the eye 201 engages and pushes up the slip ring 205 out of engagement with the hook member 203, thus allowing the eye to move entirely out of engagement with the hook. This construction obviates pulling of the pipe and sucker line simultaneously as would otherwise be necessary if the piston stuck in the pump cylinder.

It is noted that the tools 31 include a set of jars 207 shown fragmentarily in Fig. 20, thus making provision for jarring the pump cylinder 96 loose from its seat member 81 when it is desired to pull the pump as hereinbefore described. Operation of the jars 207 may also be employed to jar loose the piston should it become stuck in the cylinder. In order that the blow of the jars may be made effective when it is desired to accomplish the results just mentioned, the tools 31 include a sinker bar 208 which is connected to the jars.

The pump tubing 32 is provided midway between its ends with a gas trap 209 constructed as will now be described. Two adjacent sections of the pump tubing are spaced apart from one another to receive between them a cylindrical chamber 210 provided at its ends with heads 211, 212 respectively, the pump tubing sections being screw threaded into said heads. The head 211 is screw threaded on to a perforated tube 213 which communicates at one end with the upper section of the pump tubing and which is closed at its lower end by a hollow plug and gland 214, 215, the sucker line working through said gland. The perforations are indicated at 213ª. The conductor tube 61 passes through the heads 211, 212 and the interior of the chamber 210 communicates with a gas discharge pipe 216 which passes upward through the casing head cover 8. The gas discharge pipe 216 is provided externally of the well with a fluid pressure regulator or valve 217 having its pressure pipe 218 connected to the gas discharge pipe between the regulator and the well.

The pump tubing 32 may be provided at a suitable level, for instance between the casing head 7 and gas trap 209 with an auxiliary valved hollow piston 219 provided with a valve seat 220 adapted to be closed by a valve plug 221 which is shiftable on a hollow stem 222 surrounding the sucker line 30. The piston 219 is connected through its radial arms 223 and hollow stem 222 and a coupling 224 with a polish rod 225 of the sucker line. The piston 219 prevents settling of sediment, which may be above said piston, into that portion of the pump tubing below said piston when the pumping operation ceases, thus minimizing choking and sticking of the sucker line and pumps.

Suitable means are provided to operate the sucker line 30 and in the instance shown in the drawings, see Fig. 1, the upper end of a cable 226 is connected to the upper end of an arc member 227 which is pivoted at 228 to one end of a walking beam 229 that is pivotally mounted at 230 on a support 231. The arc member 227 is detachably connected by a pin 232 to a rod 233 which is detachably connected by a pin 233ª and socket member 235 to the under side of the walking beam 229. This construction is of value for the reason that when it is desired to disconnect the walking beam and its parts from the sucker line 30 the rod 233 can be readily disconnected from the arc member 227 so that by first disconnecting the power receiving end of the walking beam from the crank, not shown, said arc member can be swung out of alinement with the well casing in order that fishing tools and drilling tools and the like may be swung to position in alinement with the well without the walking beam and its parts interfering therewith. The cable portion 234 of the sucker line 30 is connected by a clamping device 235ª to a temper screw 236 which is adjustably screw threaded into an adjusting member 237 that is connected to the cable 226. One member 238 of said clamping device 235ª is provided with a laterally extending socket 239, the floor of which projects beneath the inner end of the clamping screw 240 that is screw threaded through a C-shaped member 241 embracing the clamp member 238 and a complementary member 242, said inner end of the screw 240 being held against outward and downward movement relative to the socket. This construction is of advantage to prevent the C-shaped member from slipping downward out of place when the clamping screw is loosened up because the inner end of the clamping screw will rest upon the bottom of the socket so as to support the C-shaped member. The clamp members 238, 242 are connected by vertical rods 243 to a stuffing box 244 which is screw threaded on to the upper end of the hollow polish rod 225 surrounding the sucker line cable 234. The stuffing box 27 in which the polish rod 225 works has its gland 246 provided with a bowl 247 drained by a tube 248, see Fig. 1ª. The upper end of the gland 246 is provided with a nipple 249 screw-threaded therein and communicating with the bowl 247, said nipple together with a cap 250 forming a cover and said cap having its top inwardly and downwardly tapered to form a funnel 251 so as to catch any fluid running down the polish rod 225 and drain it into the bowl 247. The inner edge of the funnel 251 serves to prevent liquid and gas from blowing through the cap 250 and such liquid falling into the bowl 247 is discharged therefrom through the drain tube 248 and thence into a suitable receptacle not shown.

The clamp member 238 is provided with a laterally extending arm 252 which connects to a piston rod 253 having a piston head 254 working in the cylinder of a pump 255 which is mounted on the casing head cover 8 as shown in Fig. 1. Said pump 252 has its discharge pipe 256 connected to the upper end of the conductor tube 61, said discharge pipe being provided with a valve 257. Said pump 255 is provided with a by-pass pipe 258 connected to the cylinder and to the discharge pipe 256 of the pump and said by-pass pipe 258 is provided with a fluid pressure regulator or valve 260. The discharge pipe 256 is provided with a vent pipe 261 which is controlled by a fluid pressure regulator or valve 262.

When the pump 255 is operating it produces sufficient pressure to hold the valves 260 and 262 closed, but if gas or air gets into the pump cylinder, the pressure becomes reduced to such a degree as to allow said valves to be opened by their springs so as to vent the gas through the valve 262 and allow liquid from the discharge pipe 256 to flow through the valve 260 into the pump cylinder to displace the gas therefrom, thus insuring the pump from working against a body of gas. Either or both of the valves 260, 262 may be dispensed with. The discharge pipe 256 may be provided with a check valve 262ª to facilitate lowering of the pressure when air or gas in the pump effects stoppage of the discharge.

The pipe 61 is provided with a valve 282 and is connected to a fluid pressure regulator or valve 283 opening at a predetermined lower pressure and closing at a predetermined higher pressure, the pressure pipe 284 of said regulator being connected to the pipe 61 between said regulator and said valve 282. The regulator 283 is connected by pipe 285 to a dirt trap 286 adapted to catch dirt and scale passing through a gas supply pipe 287 which is connected to any suitable source of gas supply as, for instance a compressor plant or other well, not shown. The dirt trap 286 thus functions to prevent foreign particles from reaching the automatic valves and interfering with their operation. The pipe 61 is connected to the pipe 285 around the regulator 283 by a by-pass pipe 288 provided with a check valve 289 and said by-pass pipe is provided with a blow-off pipe 290 having a fluid pressure operated valve in the form of a safety valve 291.

The outlet 25ª of the discharge T is connected by a pipe 292 to a fluid pressure regulator or valve 293 having its pressure pipe 294 connected to the pressure pipe 284. The regulator 293 is connected by a pipe 295 to a tank 296 of a trap indicated in general by the character 297, the discharge end of the pipe 295 being provided inside of said tank with a nozzle 298 turned downward at an angle so as to tend to discharge oil from the well in a circular path in the tank. The pipe 295 is provided with a valve 299 and is connected by a by-pass pipe 300 around the regulator 293 with the pipe 292, said by-pass pipe 300 having a valve 301.

The pump 225 has its intake connected by a pipe 302 to the lower end of the tank 296, the intake end of said pipe 302 being closed and being provided with a balanced valve 303 operated by a float 304. The tank 296 is provided above the level of the discharge end of the pipe 302 with an oil discharge pipe 305 having its inner end provided with a balanced valve 306 also connected to the float 304.

The tank 296 is provided internally with a tube 307 extending from near the bottom of the tank upward and provided at its upper end with a helical groove 308, there being a port 309 opening from the outside of the tube to the helical groove. Inside of the tube 307 is a second tube 310 having its lower end open and having its upper end discharging upward through the top of the tank, said second tube 310 being connected outside of the tank to any suitable device wherein the gas issuing from the tank may be used. The tube 310 is provided outside of the tank with a fluid pressure regulator or valve 311 having its pressure pipe 312 connected to the tube 310 between said valve and the tank. The pressure pipe 312 is provided with a valve 313.

The lower portion of the tank 296 forms a funnel 314 discharging through a pipe 315 into a receptacle 316 forming a portion of the trap. The pipe 315 is provided with a valve 317 and the receptacle is provided inside with a heating coil 318 connected to a suitable source of heat supply as, for instance, a steam boiler or the like, not shown. The receptacle 316 is provided with an opening 319 closed by a door 320.

The receptacle 316 is provided with water inlet pipes 321, at different levels thereof and connected to a suitable supply of water under pressure. each pipe being provided with a valve 322; and said receptacle is also provided with water outlet pipes 323 at different levels thereof connected by a manifold pipe 324 with a discharge pipe 325, each of said outlet pipes being provided with a valve 326. The pipe 325 is provided with a fluid pressure regulator or valve 327 and is connected to a stand pipe 328 which is provided with a valve 328ª.

The pump tubing 32 is provided below the packer 62 with a collar 329 forming an abutment adapted to strike against the packer head 67 when the tubing is raised for that purpose so as to jar the packer loose when it is desired to pull the packer.

Means are provided inside of the well to support the pump tubing and in the instance shown in the drawings, see Fig. 3, said means are indicated in general by the reference character 330 and surround the gas excluder pipe 108 and are constructed exactly like the packer 62 excepting that the packer ring 69 is omitted and an open cage head 331 is used at the top of the supporting means and the slip ring is in fixed relation to the barrel. The parts of the supporting means 330 which correspond to the packer 62 are indicated by the same reference characters with the addition of an index.

A collar 332 connects together the sections of the gas excluder tube 108 and rests on and is supported by the head 331, and the lower end of the gas excluder tube is provided with a collar 333 forming an abutment adapted to strike the head 67' when the pump tubing is raised for that purpose to jar loose the slips 70'.

In practice, assuming at the start that there are sufficient liquid and gaseous volumes to produce flowing thereof in the pump tubing, gas and oil from the producing sand enter the liner 4 through the perforations 5, and the oil will pass through the perforations 109 and thence through the ports 120, 122 into the float chamber passage 113 and thence into the tail pipe 107 and into the pump tubing. The gas passes into the reservoir c and thence through the port 136 and check valve 44 to the lowermost gas passage 36 and thence into the conductor tube 61.

At whichever entry equilibrium of gas pressure and liquid weight is established, the gas enters through the valve 45 thereof into the tubing. The mixture of gas and oil in the tubing, weighing less than the weight of the liquid under the pressure of gas in the reservoir c, is forced into the tank 296.

The gaseous hydrocarbons rise to the upper part of the tank 296 and most of the liquid hydrocarbons together with any water, sand and other foreign particles that may have been pumped into the tank with the oil flow downward, the liquid hydrocarbons remaining at the upper part of the column of fluid and solid particles, and the water, sand and the like seeking lower levels in the receptacle 316 by way of the pipe 315.

The separation of the heavier hydrocarbons, water and sand from one another is facilitated by the heating coil 318. The gaseous hydrocarbons may carry some of the liquid particles of hydrocarbons along with them and said liquid particles together with the gaseous hydrocarbons pass through the port 309 and are subjected to centrifugal action in the helical groove 308, the gaseous hydrocarbons then passing up through the tube 310 and the liquid particles in the groove draining downward through the tube 307, the lower end of which is sealed by the liquid.

Any desirable predetermined pressure may be maintained in the trap 297 by the fluid-pressure regulator 311 so that relatively high pressure gas will flow from the tube 310 and can be used wherever it is desirable to use high pressure gas.

The water and sand accumulating in the receptacle 316 is forced out from time to time by opening one or more of the valves 322, 326 to flush the receptacle. A desirable manner of effecting the flushing if the level of the sand is above the uppermost pipes 321, 323 is to open the uppermost valves 322, 326 to flush out some of the sand, and then to open the next lower valve 326 and close the uppermost valve 326 to cause the water to flow obliquely through the sand, and then to open the next lower valve 322 and close the uppermost valve 322 and so on so as to direct the full force of the flushing fluid against a small section only of the said column at one time.

Pressure is maintained in the trap 297 during the flushing operation by the regulator 311 and stand pipe 328, or if desired the valve 328ª may be closed and the pressure maintained by the regulators 311, 327.

From the foregoing it is clear that the products of the well are allowed to seek different levels according to their relative specific gravities and that the different products are then discharged separately from the trap 297.

The liquid in the trap 297 is prevented from lowering below a predetermined level by the action of the float 304 and when volume of liquid entering the trap through the pipe 295 is greater than the volume of liquid capable of discharging through the pipe 302 the liquid rises to or above said level and the float operates to open the valve 306 and close the valve 303 to allow the liquid hydrocarbon to enter the pipe 305 and prevent any more liquid from discharging from the trap into the pipe 302.

It is noted that owing to the specific gravity of water being greater than that of oil, the pipe 328 will be made of such height and the spring of the regulator 327 will be made of such strength as to allow for discharge of water automatically when water flows into the trap 297.

Now assuming, for example, that the production of gas from the producing strata falls off, in other words, that there is plenty of oil but not sufficient gas to cause the well to flow, gas will be admitted from the gas supply pipe 287 to the conductor tube 61 and said gas will raise the pressure sufficiently to produce flowing of the products of the well. The check valve 44 operates to prevent back pressure in the producing strata of the gas supplied by the pipe 287. Again assuming, for instance, that there is plenty of gas but an insufficient volume of oil to produce a flow, the valves 119, 121 and the valve balls 49 will close to prevent oil and gas from blowing out of the pump tubing. Gas will flow from the conductor tube 61 into the pipe 287 and may be used for pumping another well or wells or for any other purpose, the pressure of said gas operating to close the regulator 293.

It is noted that the gas rising with the oil in the pump tubing 32 separates from the oil in the gas trap 209. The regulator 217 may be so adjusted as to keep sufficient pressure of gas in the trap 209 as to cause some of said gas to pass through the perforations 213ª with the oil so as to lift the oil from the trap to the tank 297, said trap thus forming a secondary lift with the submergence equal to the pressure maintained by the regulator 217. Another portion of the gas will flow through the pipe 216 and past the regulator 217 and may be used when desired with or without further compression thereof. Also the regulator 217 may be so adjusted as to maintain pressure in the trap sufficient to maintain flow of the column of oil therethrough without the trapped gas again entering said column of oil.

If the pressures at any time in the producing strata are insufficient to effect pumping then the walking beam 229 will be operated by suitable power to reciprocate the piston 151 and the auxiliary piston 219 to lift the oil by stages to the tank 296.

Whatever gas is produced by the well itself or may be obtained from an outside source can be introduced into the conductor tube 61 and thence to a level of the liquid in the tubing dependent upon the gas pressure so as to displace a volume of liquid equal to the volume of said gas and thereby lessen the load on the pistons.

It is noted that during operation of the piston 151, if there is no oil being pumped, the valve 192 functions as a check valve to hold the column of oil thereabove so that said piston will work freely without having to carry said column of oil up and down, thus minimizing the power consumed by operation of the idle piston.

When the valve 303 is open, the pump 255 operates to force an uninterrupted stream of fluid into the well and up through the tubing to keep sand that may be in the liquid in the pump tubing from settling and to carry said sand out of the tubing so that said sand cannot form bridges or interfere with working parts of the pump. Thus a continuous flow of fluid is produced through the well tubing at rates above a predetermined minimum velocity, and, when the volumes of fluid are not greater than the capacity of the pump, the float operated valve 303 will be open and the valve 306 will be closed, thus causing the fluid to flow in a closed circuit; but when said volumes of fluid are greater than the capacity of the pump the liquid level in the trap 297 will rise to cause closure of the valve 303 and opening of the valve 306, thus causing the excess fluid to be discharged from said circuit through the pipe 305.

When the volumes of fluid coming from the well are greater than the capacity of the pump 255, the float operated valve 303 closes and causes discontinuance of the supply of fluid to the pump. Thus, when the pump has no operating fluid, all of the fluid coming from the well will be discharged from the circuit through the pipe 305.

It is noted that the different combinations hereinafter described and embodied in the appended claims may be used independently with great advantage and that, though I have illustrated many of said combinations for a single well only, one or more of said combinations may be used without departing from the spirit and scope of the invention.

It is noted that the tail pipe, or the lower end of the pump tubing in case the tail pipe is omitted, together with the reservoir space c outside of the tail pipe and tubing below the packer 62 forms a trap so that when water and oil both enter the well oil may be pumped off from the water as soon as sufficient oil collects on top of the water to displace said water and enter the tail pipe or tubing as the case may be.

Pumping of the oil off of the water was heretofore effected by inserting a pump between the pump tubing and casing and submerging said pump in the body of oil on top of the water.

To reduce the viscosity of the oil being pumped, water will be introduced into the conductor tube 61 through a pipe 501 having a valve 502.

I claim:

1. The method of pumping a well, which method consists in operating a piston pump in the well, sealing said well to maintain pressure therein substantially equal to the pressure in the surrounding strata, and discharging fluid into the pump tubing above the piston to reduce the load on the piston.

2. The method of pumping a well, which method consists in operating a piston pump in the well, sealing said well to maintain pressure therein substantially equal to the pressure in the surrounding strata, and discharging gas into the pump tubing above the piston to reduce the load on the piston.

3. The method of pumping a well, which method consists in operating a piston pump in the well, sealing said well to maintain pressure therein substantially equal to the pressure in the surrounding strata, and discharging liquid into the pump tubing above the piston to displace sediment from the tubing.

4. In combination, a well, a pump tubing therein, a piston, means to seal the well, and means operating to discharge gas in variable volume under pressure into the pump tubing above said piston to reduce the load on the piston, said volume being governed by the difference in pressure between the gas and liquid.

5. In combination, pump tubing, a piston, a sucker line to operate the piston, entries at different levels for admitting an operating fluid to the tubing, a pump operatively connected to the sucker line, fluid-conducting means connecting said pump to said entries, and pressure regulating valves for said entries operated by the fluid-pressure in the conducting means.

6. In combination, pump tubing, valved entry members to admit liquid into said tubing at different levels, a valve in the tubing below said entry members, and a pump connected to the pump tubing and to the entry member to circulate liquid through the pump tubing.

7. In combination, pump tubing, an entry member provided with means to admit a variable volume of fluid to the tubing in accordance with a predetermined ratio of pressures of the actuating and actuated fluids, means below said entry members to shut off said fluid from the producing strata, and means to supply said fluid to the entry member.

8. In combination, pump tubing, a piston at the lower end of the pump tubing to lift liquid in the tubing, an auxiliary piston above the first piston, a sucker line to operate the first piston, a polish rod around the sucker line fastened to the auxiliary piston, and means above the upper end of the tubing to connect the polish rod to the sucker line.

9. In combination, pump tubing, a piston at the lower end of the pump tubing to lift liquid in the tubing, an auxiliary piston above the first piston, a sucker cable to operate the first piston, a polish rod around the sucker cable fastened to the auxiliary piston, means attached to the sucker cable to operate said cable, and means connecting the polish rod to the operating means.

10. In combination, pump tubing, a pump having its intake connected to the pump tubing, an entry member for said tubing, a conductor tube to conduct the liquid discharged by the pump to the entry member, a piston in the pump tubing, a sucker line to operate said piston, and means operatively connecting the pump to the sucker line.

11. In combination, pump tubing, a pump, an entry member for said tubing, a conductor tube to conduct the liquid discharged by the pump to the entry member, a piston in the pump tubing, a sucker line to operate said piston, and means operatively connecting the pump to the sucker line.

12. The method of pumping a well, which consists in pumping liquid from the well, and while said liquid is being pumped forcing a portion of the liquid back into the well to prevent clogging by sand and the like.

13. The method of pumping a well, which consists in pumping equal volumes of fluid to and from the well in a closed circuit, and at the same time pumping a volume of liquid from the well.

14. In combination, pump tubing, means whereby to pump liquid from said tubing, and means to circulate a fluid through the pump tubing irrespective of the pumping of the liquid from the tubing and while the pumping is in progress.

15. In combination, a closed circuit for fluid partly formed of pump tubing and a tank, means to pump the liquid through the tubing, a discharge pipe for said tank, and a pump in said closed circuit.

16. In combination, a closed circuit for fluid partly formed of pump tubing and a tank, a discharge pipe for said tank, a float valve in the tank to control said discharge pipe, and a pump in said closed circuit.

17. In combination, a closed circuit for fluid partly formed of pump tubing and a tank, a discharge pipe for said tank, a pump in said closed circuit, and a float valve in the tank to control the flow of fluid from the tank to the pump.

18. In combination, well casing, a casing head for said casing, a gate valve connected to the casing head in axial alinement with said head, an operating line adapted to extend through the gate valve into the casing when said valve is open, and mechanism inside of the casing operated by said operating line.

19. In combination, well casing, pump tubing in said casing, a casing head for the casing, a lid for the casing head, mechanism inside of the pump tubing, a gate valve mounted on the lid, and a line connected to said mechanism and extending through said gate valve when said valve is open.

20. In combination, well casing, pump tubing in said casing, a piston in the lower portion of said tubing, a sucker line connected to the piston, means to operate said sucker line, and a valved piston in the tubing near the upper end of the tubing operatively connected to said sucker line-operating means.

21. In combination, well casing, a casing head for said casing, a gate valve connected to the casing head in axial alinement with said head, a stuffing box mounted on the gate valve, an operating line adapted to extend through the stuffing box and gate valve into the casing when said valve is open, and mechanism inside of the casing operated by said operating line.

22. In combination, pump tubing, means to discharge gas into the pump tubing to displace liquid therein to a level below the upper end of the tubing, means at said level to receive the gas and displaced liquid and to maintain the gas under its discharge pressure free from the liquid, and a piston above the level of the last named means to lift the liquid to a higher level.

23. The method of pumping a well, which consists in excluding liquid from beneath the pump piston while said piston is operating, and at the same time discharging gas into the pump tubing at a higher level than the piston to lift the liquid to a still higher level.

24. In combination, a trap, a section of pump tubing connected to the lower end of the trap, another section of pump tubing connected to the upper end of said trap, a piston working in said upper section of tubing, and a gas discharge pipe leading from said trap to the top of the upper section of the pump tubing.

25. In combination, well casing, pump tubing in said casing, an entry member for said tubing, a conductor tube connected to said entry member, and a float operated valve to prevent the entrance of liquid into said conductor tube when said liquid rises to a predetermined level.

26. In combination, well casing, pump tubing in said casing, means to seal the space between the casing and tubing, and a float operated valve to prevent the entrance of gas into the pump tubing when the liquid in the casing falls to a predetermined level.

27. In combination, well casing, pump tubing in said casing, means to seal the space between the casing and tubing, an entry member for said tubing, a conductor tube connected to said entry member, and a check valve to allow fluid to enter said conductor tube and prevent back flow of said fluid out of said conductor tube.

28. In combination, well casing, pump tubing in said casing, a valve chamber, a float operated valve to prevent the entrance of gas into the pump tubing when the liquid in the casing falls to a predetermined level, and a check valve to allow fluid to discharge from the valve chamber and prevent fluid from flowing past the valve into said valve chamber.

29. In combination, a hollow seat member, a standing valve engaging the seat of said member, a tail pipe screw-threaded into the seat member below said seat, and a perforated pipe screw-threaded into the seat member and surrounding the tail pipe.

30. In combination, pump tubing, a tubular member on the lower end of said tubing, a tail pipe extending downward from the lower end of said tubular member, and a perforated pipe around the tail pipe and fastened to the tubular member and closed at its lower end.

31. In combination, pump tubing, a tubular member on the lower end of said tubing provided with a vent, a tail pipe extending downward from the tubular member, and a perforated pipe surrounding the tail pipe and fastened to the tubular member and closed at its lower end and having its upper end communicating with said vent.

32. In combination, pump tubing, a tubular member on the lower end of said tubing, a tail pipe extending downward from the tubular member, a perforated pipe surrounding the tail pipe and fastened to the tubular member, and a check valve at the lower end of said perforated pipe to prevent fluid from passing upward through said end.

33. In combination, pump tubing, a tubular member on the lower end of said tubing, a tail pipe extending downward from the tubular member, a perforated pipe surrounding the tail pipe and fastened to the tubular member, means to close the lower end of the perforated pipe, a valve cage for the tubing provided with a seat, a valve member for said seat and a spring operating to hold said valve member toward said seat.

34. In combination, pump tubing, a tubular member on the lower end of said tubing, a tail pipe extending downward from the tubular member, a perforated pipe surrounding the tail pipe and fastened to the tubular member, a check valve at the lower end of said perforated pipe to prevent fluid from passing upward through said end, an upwardly opening valve for the tubing, and a spring tending to keep said valve closed.

35. In combination, pump tubing, a tubular member on the lower end of said tubing, a tail pipe extending downward from the tubular member, a perforated pipe surrounding the tail pipe and fastened to the tubular member, means to close the lower end of said perforated pipe and a float-operated valve to control the admission of fluid from the perforated pipe to the interior of the tail pipe.

36. In combination, a discharge T, pump tubing fastened to said T and having a cylinder, a piston in the cylinder, a sucker pipe connected to said piston, a second pipe surrounding said sucker pipe and connected to said T, packing means between the sucker pipe and said second pipe, a polish rod, and a hollow member connecting the polish rod to the sucker pipe and provided with a port.

37. Pump tubing, means to pump liquid through said tubing, means forming a reservoir adjacent the lower end of the tubing, said reservoir together with the lower end of the tubing forming a trap and means in conjunction with said trap for preventing gas under any pressure from entering the lower end of the tubing.

In testimony whereof I have hereunto set my hand this 20th day of January, 1916.

WARREN R. GREENLEE.

In presence of—
GEORGE H. HILES,
FREDERICK EHYON.

Copies of this patent may be obtained for five cents each, by addressing the "Commissioner of Patents, Washington, D. C."